(12) United States Patent
Wei et al.

(10) Patent No.: US 9,139,711 B2
(45) Date of Patent: Sep. 22, 2015

(54) POLYMER COMPOSITE MATERIAL AND METHOD OF PREPARATION THEREOF

(71) Applicant: Taiwan Textile Research Institute, New Taipei (TW)

(72) Inventors: Chi-Shu Wei, New Taipei (TW); Yen-Hsi Lin, New Taipei (TW); Pei-Fen Yang, New Taipei (TW); Cheng-Chu Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

(21) Appl. No.: 14/133,836

(22) Filed: Dec. 19, 2013

(65) Prior Publication Data

US 2014/0309330 A1 Oct. 16, 2014

(30) Foreign Application Priority Data

Apr. 12, 2013 (TW) .............................. 102113109 A (51) Int. Cl.
| | |
|---|---|
| *C08K 5/053* | (2006.01) |
| *C08L 71/02* | (2006.01) |
| *C08K 3/36* | (2006.01) |
| *C08L 31/04* | (2006.01) |
| *C08L 33/08* | (2006.01) |
| *C08L 83/00* | (2006.01) |
| *C08G 63/47* | (2006.01) |
| *C08G 63/685* | (2006.01) |
| *C08L 67/06* | (2006.01) |

(52) U.S. Cl.
CPC ................ *C08K 5/053* (2013.01); *C08G 63/47* (2013.01); *C08G 63/6858* (2013.01); *C08K 3/36* (2013.01); *C08L 31/04* (2013.01); *C08L 33/08* (2013.01); *C08L 67/06* (2013.01); *C08L 83/00* (2013.01)

(58) Field of Classification Search
CPC ........... C08K 3/37; C08K 5/053; C08L 71/02
See application file for complete search history.

(56) References Cited

U.S. PATENT DOCUMENTS

| | | |
|---|---|---|
| 2004/0138328 A1 | 7/2004 | Kohr et al. |
| 2010/0269236 A1 | 10/2010 | Wagner et al. |
| 2011/0014996 A1 | 1/2011 | Shepherd et al. |
| 2011/0283433 A1 | 11/2011 | Holt et al. |

FOREIGN PATENT DOCUMENTS

| | | | |
|---|---|---|---|
| EP | 1897609 A2 | | 3/2008 |
| JP | 2003103917 A | * | 4/2003 |
| WO | 2007/107171 A1 | | 9/2007 |

OTHER PUBLICATIONS

Sarier et al. "The manufacture of microencapsulated phase change materials suitable for the design of thermally enhanced fabrics" Thermochimica Acta, Elsevier Science Publishers, Amsterdam. NL, vol. 452, No. 2, (Dec. 22, 2006), pp. 149-160.
Nihal Sarier et al, "Organic phase change materials and their textile applications: An overview" Thermochimica Acta, Elsevier Science Publishers, Amsterdam. NL, vol. 540, (Apr. 10, 2012), pp. 7-60.
S.Y. Lee, Synthesis and Characterization of Novel UV-curable Waterbone Polyurethane Acrylate Resins, Shandong Light Industry School, 2008.
Amit Bhattacharya, James W. Rawlins, and Paramita Ray, Polymer Grafting and Crosslinking, 2009.

* cited by examiner

*Primary Examiner* — Vickey Nerangis
(74) *Attorney, Agent, or Firm* — McClure, Qualey & Rodack, LLP (57) ABSTRACT

The present disclosure relates to a polymer composite material and preparation method thereof. The polymer composite material includes a polyol and a phase changed cross-linking polymer. The phase changed cross-linking polymer has at least one ionic group, a hydrogen bond is formed between the ionic group and the hydroxyl group of the polyol, the polyol is encapsulated and dispersed within the phase changed cross-linking polymer, and a weight percentage of the polyol is 20-60%, a weight percentage of the phase changed cross-linking polymer is 40-80%.

9 Claims, 8 Drawing Sheets

POLYMER COMPOSITE MATERIAL AND METHOD OF PREPARATION THEREOF

RELATED APPLICATIONS

This application claims priority to Taiwanese Application Serial Number 102113109, filed Apr. 12, 2013, which is herein incorporated by reference.

BACKGROUND

1. Field of Invention

The present invention relates to a material and a method of preparation thereof. More particularly, the present invention relates to a polymer composite material and a method of preparation thereof.

2. Description of Related Art

In daily life, many activities bring risks of human body injuries caused by external impacts. Especially when people are performing certain high-risk activities, such as bicycle racing, skating, skiing, horseback riding, heavy motorcycle riding, racing, various safety equipments such as helmets or sports goggles are required to reduce external impacts which might applied to human body.

Most of those safety equipments are made of acrylonitrile butadiene styrene (ABS), ethylene-vinyl acetate (EVA), and/or polyurethane (PU). These materials have good stress buffering properties to reduce external impacts which might applied to human body. The hardness of these materials not only offers good protection for users, but also limits flexibility of users' actions, and also brings sweltering and uncomfortable feelings to users.

In this regard, "shear thickening fluid (STF)" materials are provided to offer both of good protection and flexibility. For example, D3o is one currently commercially available product of STF materials, and is applied in many safety equipments such as ski clothes, skateboard shoes, kendo and motorcycle clothes and other applications. However, sweltering and uncomfortable feelings when wearing those safety equipments are still required to be improved. Accordingly, improvements in materials and methods of preparation thereof continue to be sought.

SUMMARY

The present disclosure provides a polymer composite material, which has stress and temperature buffering properties, and a method of preparation thereof. The polymer composite material could be cured under UV or heat source. Therefore, not only the polymer composite material has double buffering properties (stress and temperature), but also the method of preparation thereof is energy saving and environment friendly. Besides, the polymer composite material of the present disclosure could be applied in various products such as temperature control type protection pads or temperature control type fabric pads.

The present disclosure, in one aspect, relates to a polymer composite material includes a polyol and a phase changed cross-linking polymer. The phase changed cross-linking polymer has at least one ionic group, a hydrogen bond is formed between the ionic group and the hydroxyl group of the polyol, the polyol is encapsulated and dispersed within the phase changed cross-linking polymer, and a weight percentage of the polyol is 20-60%, a weight percentage of the phase changed cross-linking polymer is 40-80%.

In various embodiments of the present disclosure, the polyol further includes a plurality of inorganic oxide particles dispersed in the polyol.

In various embodiments of the present disclosure, the inorganic oxide particles are nanoscale silica particles, and the polyol is a non-Newtonian fluid.

In various embodiments of the present disclosure, a particle size of the nanoscale silica particles is less than 50 nm.

In various embodiments of the present disclosure, the polyol is polyethylene glycol (PEG), polytetrahydrofuran (PTMG), glycerol or combinations thereof.

In various embodiments of the present disclosure, the phase changed cross-linking polymer is a cross-linked polymer network of oligomer precursors, the oligomer precursor has at least two carbon-carbon double bonds (C=C), at least one ionic group, and at least one polyester segment.

In various embodiments of the present disclosure, the oligomer precursor is a co-polymer composed of the polyol, an ene-dianhydride, and a triethanolamine or a triethylamine.

In various embodiments of the present disclosure, the oligomer precursor further includes a hydroxyethyl methacrylate (HEMA).

In various embodiments of the present disclosure, a phase transition temperature of the phase changed cross-linking polymer is 2° C.-27° C.

In various embodiments of the present disclosure, the polymer composite material further includes a polyurethane (PU), an ethylene-vinyl acetate co-polymer, a silicone resin or combinations thereof.

The present disclosure, in another aspect, relates to a method of fabricating a polymer composite material. The method includes mixing a first polyol and an anhydride to form an oligomer (I) by an esterification reaction. Both ends of the oligomer (I) are carboxylic acid groups. The method further includes mixing the oligomer (I) and a hydroxyethyl methacrylate (HEMA). The hydroxyethyl methacrylate (HEMA) reacts with one end of the oligomer (I) to form an oligomer (II) in a condensation reaction. The method further includes mixing the oligomer (II) with a triethanolamine or a triethylamine. The triethanolamine or the triethylamine (TEA) compounds with the other end of the oligomer (II) to form an oligomer precursor having an ionic group. The method further includes mixing a second polyol with the oligomer precursor to form a mixture. The ionic group of the second polyol and the ionic group of the oligomer generate a hydrogen bond. The method further includes adding a double bond initiator into the mixture of the second polyol and the oligomer precursor. The double bond initiator is capable to initiate a cross-linking polymerization reaction. The method further includes applying UV light or heat to the mixture of the second polyol and the oligomer precursor to generate the cross-linking polymerization reaction is occurred to cross-link the oligomer precursor and a phase changed cross-linking polymer is formed, and the second polyol is encapsulated and dispersed in the phase changed cross-linking polymer.

The present disclosure, in another aspect, relates to a method of fabricating a polymer composite material. The method includes mixing a first polyol and an anhydride to form an oligomer (I) by an esterification reaction. Both ends of the oligomer (I) are carboxylic acid groups. The method further includes mixing a triethanolamine or a triethylamine with one end of the oligomer (I) to form an oligomer precursor having an ionic group, wherein the ionic group is compounded of one end of the oligomer (I) with the triethanolamine or the triethylamine. The method includes mixing a second polyol with the oligomer precursor to form a mixture. The ionic group of the second polyol and the ionic group of the oligomer generate a hydrogen bond. The method includes adding a double bond initiator into the mixture of the second polyol and the oligomer precursor. The double bond initiator is capable to initiate a cross-linking polymerization reaction. The method includes applying UV light or heat to the mixture of the second polyol and the oligomer precursor to generate the cross-linking polymerization reaction is occurred to cross-link the oligomer precursor and a phase changed cross-linking polymer is formed, and the second polyol is encapsulated and dispersed in the phase changed cross-linking polymer.

In various embodiments of the present disclosure, the second polyol further includes a plurality of inorganic oxide particles dispersed in the second polyol.

In various embodiments of the present disclosure, the inorganic oxide particles are nanoscale silica particles, and the second polyol is a non-Newtonian fluid.

In various embodiments of the present disclosure, a particle size of the nanoscale silica particles is less than 50 nm.

In various embodiments of the present disclosure, the first polyol is polyethylene glycol (PEG), polytetrahydrofuran (PTMG) or a combination thereof.

In various embodiments of the present disclosure, the second polyol is polyethylene glycol (PEG), polytetrahydrofuran (PTMG), glycerol or combinations thereof.

In various embodiments of the present disclosure, the oligomer precursor has at least two carbon-carbon double bonds (C=C), at least one ionic group, and at least one polyester segment.

In various embodiments of the present disclosure, the oligomer precursor is formed by copolymerization of a polyol, an ene-dianhydride, and a triethanolamine or a triethylamine (TEA).

In various embodiments of the present disclosure, before the operation applying UV light or heat to the mixture of the second polyol and the oligomer precursor, the method further includes adding a polyurethane (PU), an ethylene-vinyl acetate copolymer, a silicone resin, or combinations thereof into the mixture of the second polyol and the oligomer precursor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
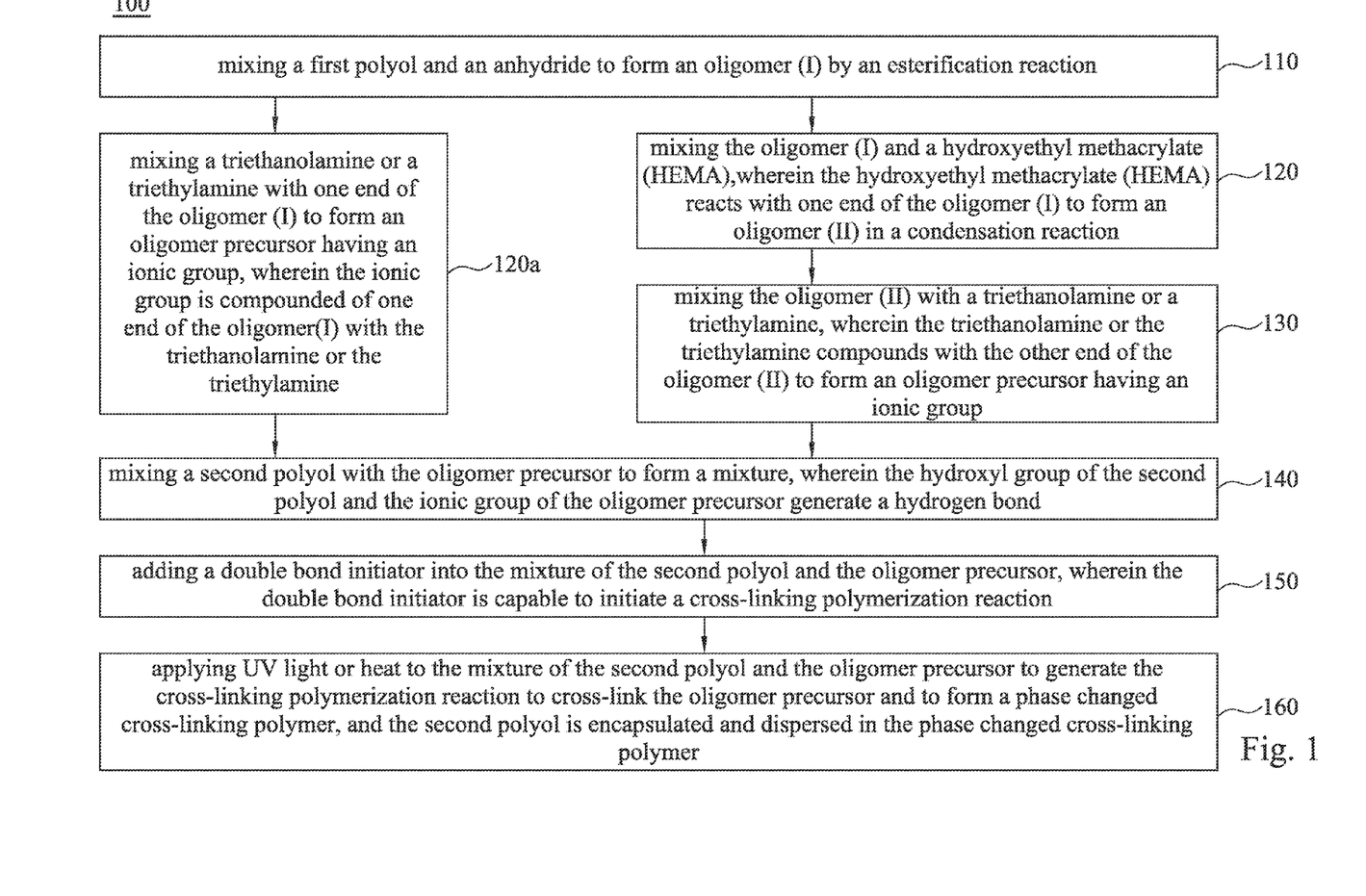
FIG. 1 is a flowchart illustrating methods 100 of fabricating polymer composite materials according to various embodiments of the present disclosure.

Referring to FIG. 1, FIG. 1 is a flowchart illustrating methods 100 of fabricating polymer composite materials according to various embodiments of the present disclosure. In some embodiments of the present disclosure, the methods 100 include mixing a first polyol and an anhydride to form an oligomer (I) by an esterification reaction, wherein both ends of the oligomer (I) are carboxylic acid groups (operation 110). The methods 100 further include mixing the oligomer (I) and a hydroxyethyl methacrylate (HEMA), wherein the hydroxyethyl methacrylate (HEMA) reacts with one end of the oligomer (I) to form an oligomer (II) in a condensation reaction (operation 120). The methods 100 further include mixing the oligomer (II) with a triethanolamine or a triethylamine, wherein the triethanolamine or the triethylamine compounds with the other end of the oligomer (II) to form an oligomer precursor having an ionic group (operation 130). The methods 100 further include mixing a second polyol with the oligomer precursor to form a mixture (operation 140), wherein the ionic group of the second polyol and the ionic group of the oligomer generate a hydrogen bond. The methods 100 further include adding a double bond initiator into the mixture of the second polyol and the oligomer precursor (operation 150), wherein the double bond initiator is capable to initiate a cross-linking polymerization reaction. The methods 100 further include applying UV light or heat to the mixture of the second polyol and the oligomer precursor to generate the cross-linking polymerization reaction is occurred to cross-link the oligomer precursor and a phase changed cross-linking polymer is formed, and the second polyol is encapsulated and dispersed in the phase changed cross-linking polymer (operation 160). In other embodiments of the present disclosure, the methods 100 include mixing a first polyol and an anhydride to form an oligomer (I) by an esterification reaction (operation 110), wherein both ends of the oligomer (I) are carboxylic acid groups. The methods 100 further include mixing a triethanolamine or a triethylamine with one end of the oligomer (I) to form an oligomer precursor having an ionic group, wherein the ionic group is compounded of one end of the oligomer (I) with the triethanolamine or the triethylamine (operation 120a). The methods 100 further include mixing a second polyol with the oligomer precursor to form a mixture, wherein the hydroxyl group of the second polyol and the ionic group of the oligomer precursor generate a hydrogen bond (operation 140). The methods 100 further include adding a double bond initiator into the mixture of the second polyol and the oligomer precursor, wherein the double bond initiator is capable to initiate a cross-linking polymerization reaction (operation 150). The methods 100 further include applying UV light or heat to the mixture of the second polyol and the oligomer precursor to generate the cross-linking polymerization reaction is occurred to cross-link the oligomer precursor and a phase changed cross-linking polymer is formed, and the second polyol is encapsulated and dispersed in the phase changed cross-linking polymer. According to various embodiments of the present disclosure, the phase changed cross-linking poly- mer may be light-curing phase changed cross-linking polymer or heat-curing phase changed cross-linking polymer (operation 160).

In operation 110, the first polyol may be, but not limited to, polymers of polyols such as ethylene glycol, 1,2-propanediol, 1,3-butanediol, pentanediol-2,4,2-methyl-2,4-pentanediol, 2,5-hexanediol, heptanediol-2,4,2-ethyl-1,3-hexanediol, diethylene glycol, dipropylene glycol, triethylene glycol, triethylene glycol, polytetrahydrofuran (PTMG), or combinations thereof. The anhydride may be compounds having two anhydride functional groups such as maleic anhydride, methyl maleic anhydride, succinic anhydride, or combinations thereof. However, the present disclosure is not limited thereto. The details of operation 110 are illustrated as a following chemical reaction formula, the first polyol is, for example, a polyethylene glycol (PEG), and the anhydride is, for example, a maleic anhydride:

As the chemical reaction formula above, in operation 110, the polyethylene glycol (PEG)(1) and the maleic anhydride (2) are mixed to react. The molar ratio of polyethylene glycol (PEG)(1) and the maleic anhydride (2) may be substantially less than 1. A ring-opening esterification reaction is occurred between a hydroxyl group (—OH) of the polyethylene glycol (PEG)(1) and anhydride (—C(O)2O) of the maleic anhydride (2) under appropriate conditions. Therefore the oligomer (I) is formed, and both ends of the oligomer (I) are carboxylic acid groups. The m in above formula represents the quantity of a repeating unit, (—CH2CH2-). The m may be any positive integers, and the E in above formula represents a general formula of —(CH2CH2)m-O—. Various m indicates that E has various length of connected repeating unit, (—CH2CH2-), such that the molecular weight of polyethylene glycol (PEG)(1) could be varied. In various embodiments of the present disclosure, various m may be determined according to different demands to fabricate oligomers (I) with different repeating unit.

Referring to FIG. 1, after preparation of oligomer(I) is completed in operation 110, the oligomer(I) is mixed with a hydroxyalkyl esters of unsaturated carboxylic acid to form an oligomer(II), wherein the hydroxyalkyl esters of unsaturated carboxylic acid reacts with one end of the oligomer (I) in a condensation reaction in operation 120. The hydroxyalkyl esters of unsaturated carboxylic acid may be 2-hydroxyethyl acrylate (HEA), 2-hydroxyethyl methacrylate (HEMA), hydroxypropyl acrylate (HPH), hydroxy propyl ethacrylate (HPMA), or combinations thereof. However, the present disclosure is not limited thereof. The details of operation 120 are illustrated as a following chemical reaction formula, the oligomer(I), for example, the product of aforementioned polyethylene glycol (PEG) as the first polyol and aforementioned maleic anhydride as the anhydride reacts with 2-hydroxyethyl methacrylate (HEMA) as hydroxyalkyl esters of unsaturated carboxylic acid:

As the chemical reaction formula above, in operation 120, oligomer(I) reacts with the hydroxyalkyl esters of unsaturated carboxylic acid (3). The molar ratio of oligomer (I) and 2-hydroxyethyl methacrylate (HEMA) (3) may be substantially equal to 1. The carboxylic acid group (—COON) of the oligomer (I) reacts with the hydroxyl group (—OH) of 2-hydroxyethyl methacrylate (HEMA) (3) in a condensation reaction, such that 2-hydroxyethyl methacrylate (HEMA) is grafted on the oligomer (I). It should be noticed that the hydroxyethyl methacrylate reacts with one end of the oligomer (I) in the condensation reaction because of stereo hindrance. Therefore, the oligomer (II) with the other end of non-reacted carboxylic acid group is prepared after operation 120.

Referring to FIG. 1, after preparation of the oligomer (II) is completed in operation 120, the oligomer (II) is mixing with a triethanolamine or a triethylamine to form an oligomer precursor having an ionic group in operation 130. The triethanolamine or the triethylamine compounds with the other end of the oligomer (II). The details of operation 130 are illustrated as a following chemical reaction formula:

As the chemical reaction formula above, in operation 130, oligomer (II) is mixed with a triethanolamine. The other carboxylic acid group (the other end of oligomer (II)) compounds with the triethanolamine with an ionic covalent bond under appropriate reaction conditions. Therefore, an oligomer precursor having an ionic group is formed. It should be noticed that the oligomer precursor in various embodiments of the present disclosure has at least two carbon-carbon double bonds (C═C), at least one ionic group, and at least one polyester segment.

In other various embodiments of the present disclosure, after the preparation of oligomer (I) is completed in operation 110, operation 120a is performed instead of operation 120 and 130. In other words, oligomer (I) may not react with the hydroxyalkyl esters of unsaturated carboxylic acid to form the oligomer(II), but may be directly mixed with the triethanolamine to form another oligomer precursor. The oligomer precursor also has at least two carbon-carbon double bonds (C═C), at least one ionic group, and at least one polyester segment.

Continually referring to FIG. 1, after the preparation of the oligomer precursor is completed in aforementioned operation 130 or 120a, the oligomer precursor is mixed with a second polyol in operation 140. A hydrogen bond is formed between a hydroxyl group (—OH) of the second polyol and the ionic group of the oligomer precursor. The second polyol may be polymers of polyol such as ethylene glycol, 1,2-propanediol, 1,3-butanediol, pentanediol-2,4,2-methyl-2,4-pentanediol, 2,5-hexanediol, heptane diol-2,4,2-ethyl-1,3-hexanediol, diethylene glycol, dipropylene glycol, triethylene glycol, and triethylene glycol, polytetrahydrofuran (PTMG), glycerol or combinations thereof. However, the present disclosure is not limited thereto. In various embodiments of the present disclosure, the second polyol further includes a plurality of inorganic oxide particles dispersed in the second polyol. The inorganic oxide particles may be nanoscale silica ($SiO_2$) particles, and the second polyol is a non-Newtonian fluid. The size of nanoscale silica ($SiO_2$) particles may be less than 50 nm, however, the present disclosure is not limited thereto.

Referring to FIG. 1, after the preparation of the mixture of the second polyol and the oligomer precursor is completed in operation 140, a double bond initiator is added into the mixture of the second polyol and the oligomer precursor in operation 150. The double bond initiator is capable to initiate a cross-linking polymerization reaction for the carbon-carbon double bonds (C═C) of the oligomer precursor. Therefore, the cross-linking polymerization reaction (an adding polymerization reaction) could be initiated to occur between the carbon-carbon double bonds (C═C) of the oligomer precursor. The double bond initiator may be a photo polymerization initiator, a thermal polymerization initiator, or a combination thereof. The photo polymerization initiator could be compounds which are capable to generate free radicals by applying lights. For example, benzoin and benzoin derivatives such as benzoin methyl ether, benzoin ethyl ether, benzoin isopropyl ether, benzoin phenyl ether, benzoin acetate; acetophenone and acetophenone derivatives such as 2,2-dimethoxy-2-phenylacetophenone, 2,2-diethoxy-2-phenyl acetophenone, 1,1-dichloride acetophenone; amino acetophenones such as 2-methyl-1-[4-(methyl thio) phenyl]-2-morpholino-amine acetone-1,2-benzyl-2-dimethylamino-1-(4-morpholinyl phenyl)-butane-1-one, N,N-dimethylamino-acetophenone; anthraquinones such as 2 methylanthraquinone, 2-ethylanthraquinone, 2-tert-butylanthraquinone, 1-chlorinated anthraquinone; thioxantones such as 2,4-dimethyl thioxanthone ketone, 2,4-diethyl thioxanthone ketone, 2-thioxanthone chloride, 2,4-diisopropyl thioxanthone; acetals such as acetophenone dimethyl acetal, benzyl dimethyl acetal, or combinations thereof. However, the present disclosure is not limited thereto. Conventional photo polymerization initiators disclosed in the European patent application EP1456307B1 may be also incorporated. The thermal polymerization initiator may be, but not limited to, peroxides such as benzoyl peroxide (BPO), persulfates such as ammonium persulfate (APS), azo compounds such as azobisisobutyronitrile (AIBN), or combinations thereof.

Figure 2:
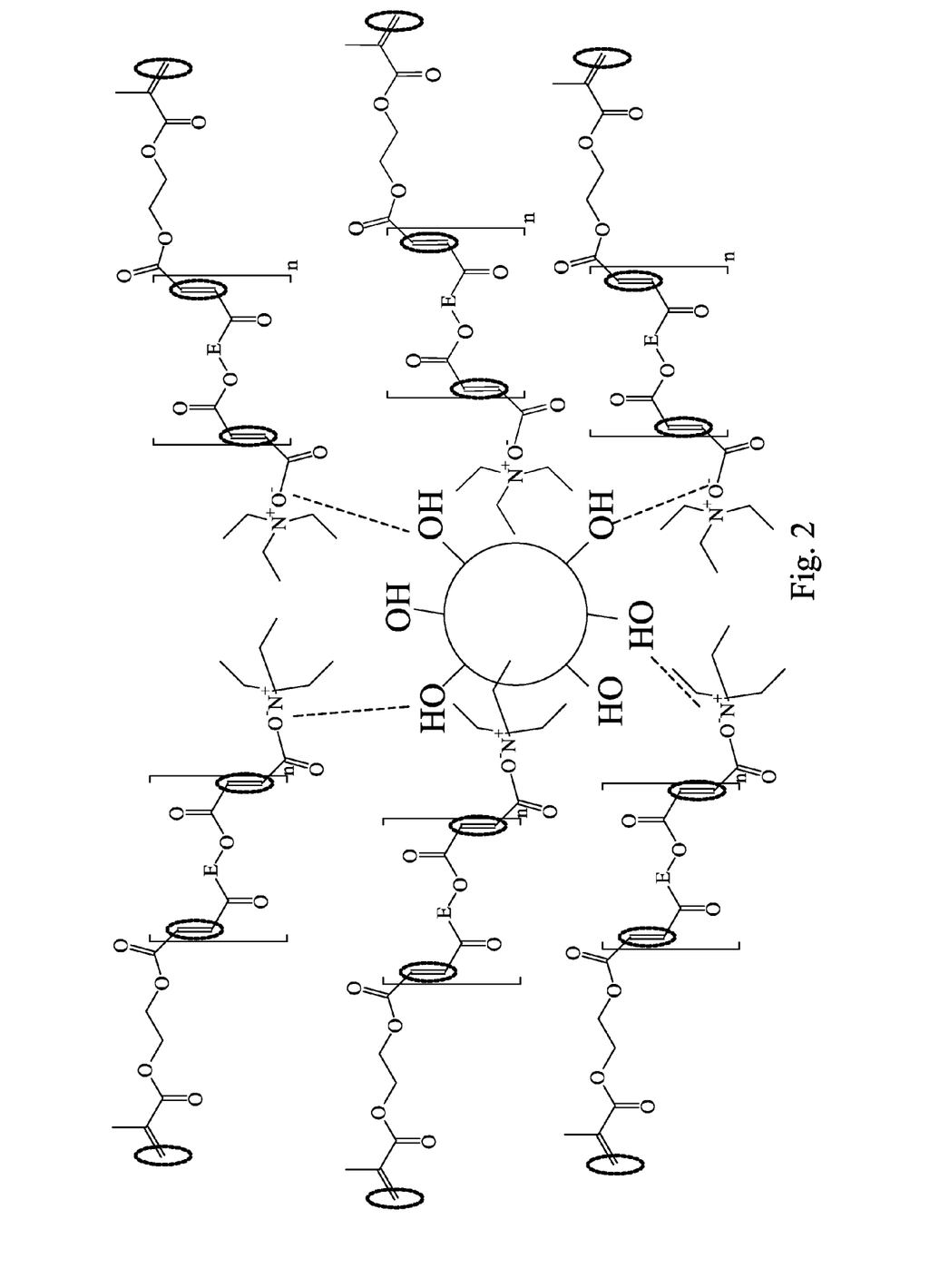
FIG. 2 is a schematic diagram of the mixture of the second polyol and the oligomer precursors.

Referring to FIG. 2, after the double bond initiator is added into the mixture of the second polyol and the oligomer precursor, UV light or heat is applied to the mixture of the second polyol and the oligomer precursor to generate the cross-linking polymerization reaction is occurred to cross-link the oligomer precursor and a phase changed cross-linking polymer is formed, and the second polyol is encapsulated and dispersed in the phase changed cross-linking polymer. Specifically, the double bond initiator added in aforementioned operation 150 initiates the carbon-carbon double bonds (C═C) to react in an adding polymerization reaction by applying UV light or heat in following operation 160. Therefore, the oligomer precursors are cross-linked to form the phase changed cross-linking polymer, and the second polyols, which are dispersed between the oligomer precursors by hydrogen bonds, are covered and dispersed in the phase changed cross-linking polymer. Accordingly, the second polyols covered and dispersed in the phase changed cross-linking polymer could be regarded as a non-Newtonian fluid. The shear thickening properties of the second polyols also lead stress buffer properties of the phase changed cross-linking polymer. Besides, after the carbon-carbon double bonds (C═C) of the oligomer precursors are adding polymerized to form the phase changed cross-linking polymer, polyester segments of each oligomer precursor are still existed in the phase changed cross-linking polymer. Since the polyester segment is soft and flexible, the polyester segment in the phase changed cross-linking polymer could rotate or rearrange to stack as different phase with various density of polymer segment alignment. Therefore, the polyester segments in the phase changed cross-linking polymer could rotate or rearrange the polymer segment alignment, and the phase changed cross-linking polymer has extra endothermic and/or exothermic properties. In other words, part of the phase changed cross-linking polymer would phase change by rotating or rearranging of the polyester segment. Therefore, in general cases, a temperature of the phase changed cross-linking polymer would accordingly increase or decrease when confronting heat flows in or out. However, under certain temperatures, phase changes would also occur in part of the phase changed cross-linking polymer, and therefore the phase changed cross-linking polymer also could be regarded as a temperature buffer.

In other various embodiments of the present disclosure, before applying UV light or heat to the mixture of the second polyol and the oligomer precursor in operation 160, further includes adding a polyurethane (PU), an ethylene-vinyl acetate copolymer, a silicone resin, or combinations thereof into the mixture of the second polyol and the oligomer precursor. In other words, the polyurethane (PU), the ethylene-vinyl acetate copolymer, the silicone resin, or combinations thereof could be added into the mixture of the second polyol and the oligomer precursor first, then UV light or heat is applied to cross-link. Therefore, the oligomer precursors are cross-linked to form the phase changed cross-linking polymer, and the second polyols, the polyurethane (PU), the ethylene-vinyl acetate copolymer, the silicone resin, or combinations thereof are covered and dispersed in the phase changed cross-linking polymer.

As aforementioned, conventional stress buffering materials such as polyurethane (PU), ethylene-vinyl acetate copolymer (foam material), and silicone resin could be covered and dispersed in the phase change cross-linked polymer. Therefore, stress buffering properties of the phase changed cross-linking polymer could be further improved base on conventional stress buffering materials such as polyurethane (PU), ethylene-vinyl acetate copolymer (foam material), and silicone resin.

To sum up, the carbon-carbon double bonds (C=C), the ionic groups and polyester segments in the oligomer precursor, which is fabricated in operation 110 to 130 illustrated in FIG. 1, are respectively performing different functions. The ionic group forms the hydrogen bond with the hydroxyl group (—OH) of the second polyol in operation 140, and therefore the second polyols with stress buffering properties could be well dispersed between the oligomer precursors. The carbon-carbon double bonds (C=C) would perform adding polymerization of the oligomer precursors in operation 160, and therefore the second polyols with stress buffering properties could be further encapsulated in the phase changed cross-linking polymer. Therefore, the phase changed cross-linking polymer according to various embodiments of the present disclosure has stress buffering properties. On the other hand, the polyester segments in the phase changed cross-linking polymer could rotate or rearrange to be endothermic or exothermic additionally. Therefore, the phase changed cross-linking polymer according to various embodiments of the present disclosure has temperature buffering properties. Accordingly, a polymer composite material (with the phase changed cross-linking polymer and the second polyols) having double buffering functions, stress and temperature, is fabricated.

The polymer composite material having double buffering functions (stress and temperature) according to various embodiments of the present disclosure may be applied in various ways and fabricated in various products. For example, (1). Sports liner objects such as sporting goods shoulder pads, nursing rib, shin guards, lumbar and femoral pads. Except for pad objects, stress buffering properties may also utilized as bandages, elastic sleeves or packaging materials such as gauze to ensure the protection of human body's extremities; (2). The movement of the protective liner and industrial hand protecting objects, including gloves; (3). Cushioning objects such as car seats within the absorber to disperse high vibration, gravity loads and side impact; (4). Medical objects such as lumps or neck fixation during certain processes such as X-ray to support body weight of patients who is limited or paraplegia; (5). Severe injury protection pads which are combined with other protection equipments such as bulletproof vests. However, the present disclosure is not limited thereto. It should be noticed that the polymer composite material also has temperature buffering properties, and therefore sweltering and uncomfortable feelings while wearing aforementioned products could be effectively improved.

Embodiment 1

First, polytetramethylene glycol (PTMG) and maleic anhydride (MA) are mixed. The molecular weight of PTMG is substantially 3000 (g/mol). About 556.87 g of PTMG and about 26 g of MA are weighted and mixed to perform an esterification reaction under suitable reaction conditions to form the oligomer (I). Both ends of the oligomer (I) are carboxylic acid groups. Next, about 6.9 g of 2-hydroxyethyl methacrylate (HEMA) is weighted and mixed with one end of the oligomer (I) to form oligomer (II) in condensation reaction. HEMA is reacted with one end of the oligomer (I). Next, about 15.82 g of triethanolamine is mixed with the oligomer (II). Triethanolamine is reacted with the other end of the oligomer (II) to form the oligomer precursor of Embodiment 1 of the present disclosure, PT30-MA-HT.

On the other hand, a solution of shear thickening fluid (STF) is prepared. The STF solution includes silica ($SiO_2$) particles. The STF solution is prepared by adding $SiO_2$ particles (the average particle size is 15 nm) into glycerol (propane-1,2,3-triol). The weight percentage of the $SiO_2$ particles is 35% in the STF solution.

Finally, about 20 g of the oligomer precursor of Embodiment 1 of the present disclosure, PT30-MA-HT, is mixed with 20 g of the STF solution and 0.5 g of initiator (Chivacure® TPO). UV light (with a wavelength about 365 nm, power about 500 W) is applied to the mixture of the oligomer precursor, the STF solution, and the initiator. Therefore, carbon-carbon double bonds (C=C) in the oligomer precursor of Embodiment 1, PT30-MA-HT, are cross-linked under the effect of the initiator (Chivacure® TPO) to form a phase changed cross-linking polymer, and the STF dispersed between the oligomer precursors, PT30-MA-HT, are encapsulated and dispersed within the phase changed cross-linking polymer.

Figure 3:
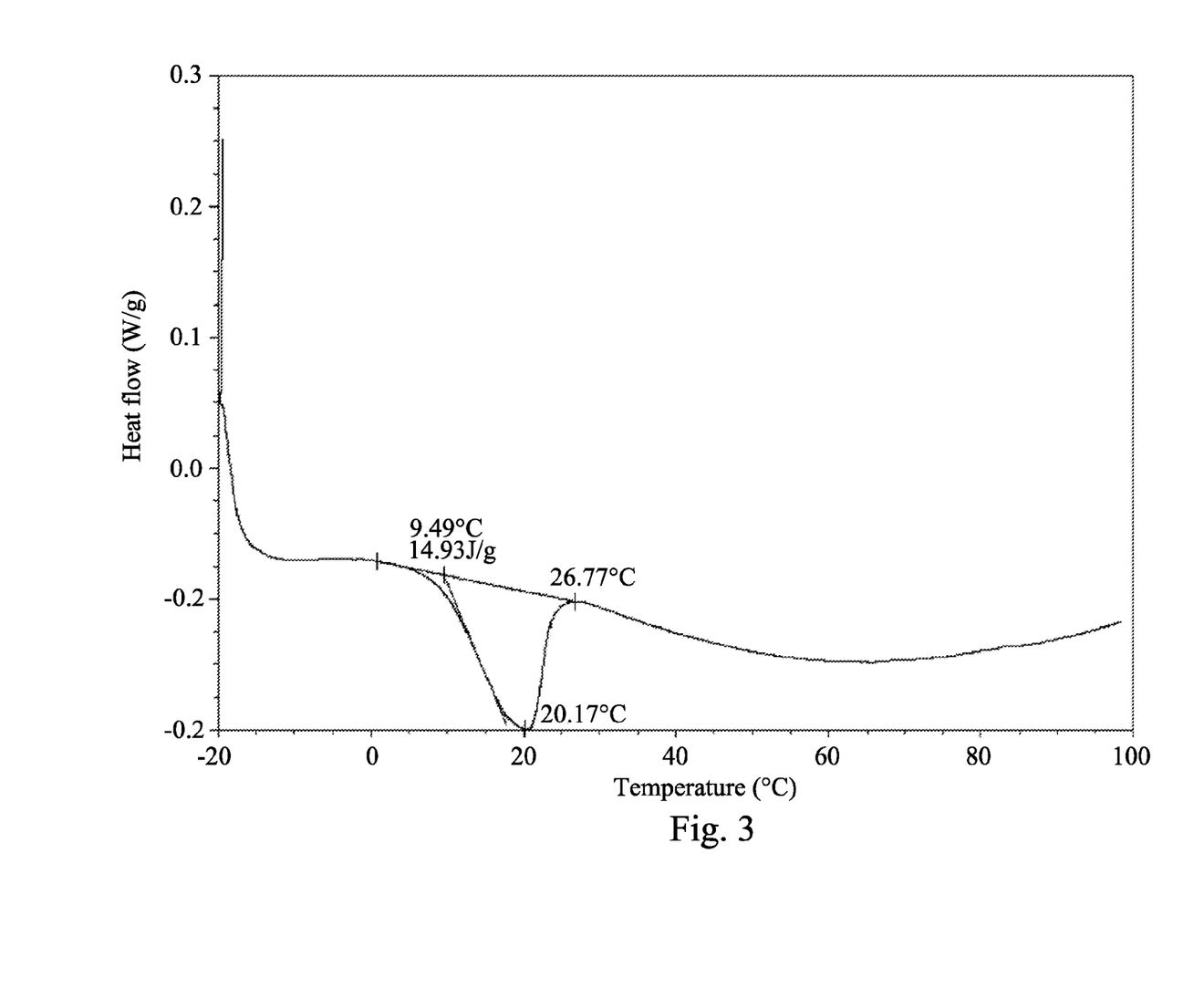
FIG. 3 is the experiment data in differential scanning calorimeter (DSC) of Embodiment 1 of the present disclosure.

Referring to FIG. 3, FIG. 3 is the experiment data in differential scanning calorimeter (DSC) of Embodiment 1 of the present disclosure. DSC is a thermo-analytical technique in which the difference in the amount of heat flow required to increase the temperature of a sample and reference is measured as a function of temperature. Both the sample and reference are placed in a chamber and maintained at nearly the same temperature throughout the experiment. An inert gas (such as nitrogen) flows through the chamber in a steady flow rate to stabilize environment of the chamber. Heat flows of the sample (as shown in y-axis of FIG. 3), Embodiment 1 of the present disclosure, are continually detected and recorded while a process of increasing the temperatures of the sample (as shown in x-axis of FIG. 3). In FIG. 3, heat flows from the sample (exothermic) are defined as positive values (upward);

and heat flows in the sample (endothermic) are defined as negative values (downward). The x-axis represents various temperatures of the sample during the procedure of DSC measuring. As shown in FIG. 3, the sample, Embodiment 1, could phase change and be endothermic at 20.17° C. because of rotating or rearranging of the polyester segments in the phase changed cross-linking polymer. The phase transition temperature of Embodiment 1 substantially ranges from about 9.49° C. to about 26.77° C. In other words, Embodiment 1 has special endothermic properties in the range of its phase transition temperature, and the main endothermic temperature is 20.17° C. Accordingly, the phase changed cross-linking polymer of Embodiment 1 of the present disclosure possesses temperature buffering properties.

Figure 4:
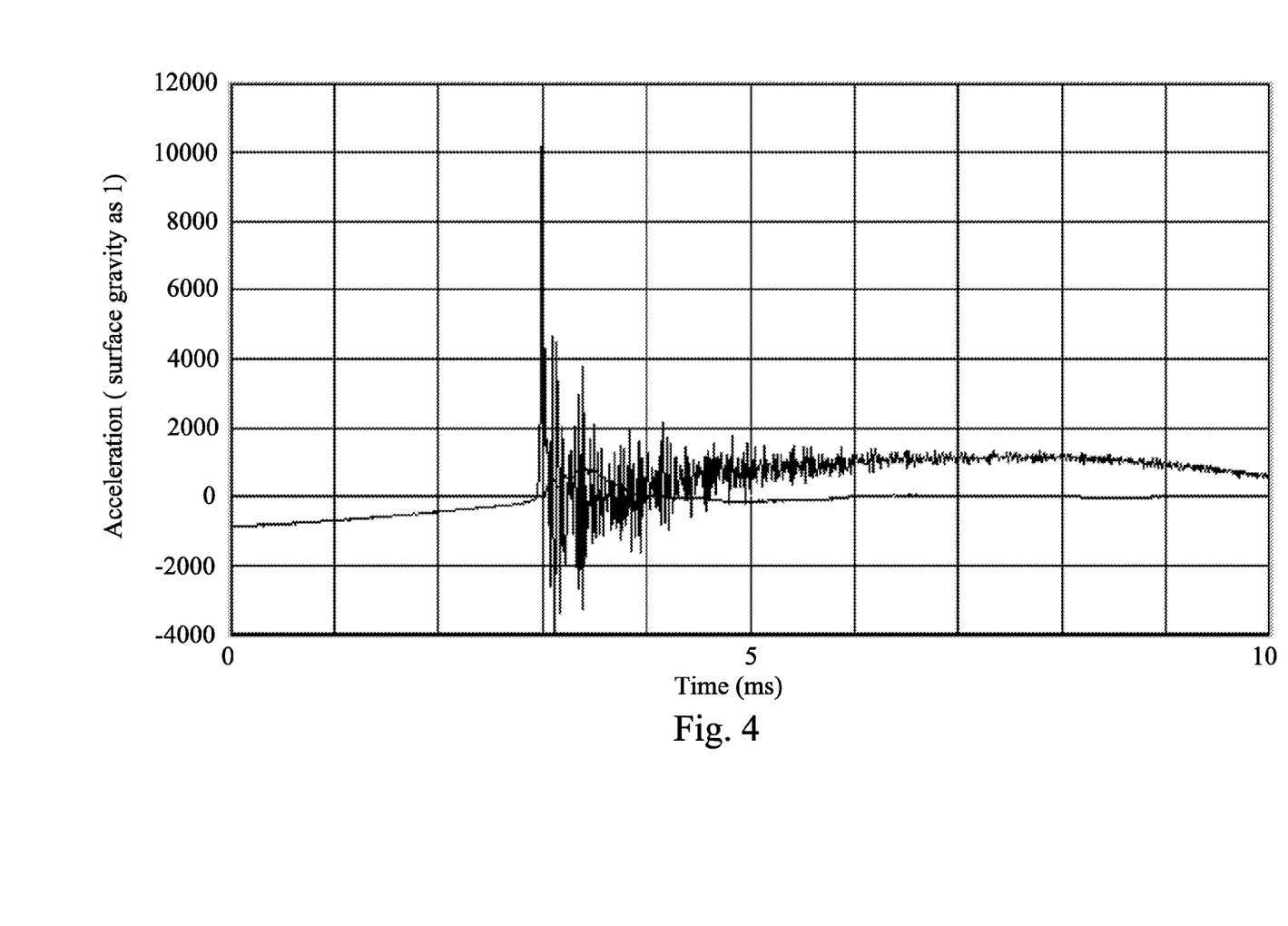
FIG. 4 is the experiment data in impact test of Embodiment 1 of the present disclosure.

Referring to FIG. 4, FIG. 4 is the experiment data in impact test of Embodiment 1 of the present disclosure. In FIG. 4, the y-axis represents accelerations detected while testing impact is applied to the sample of Embodiment 1. The unit of the accelerations in the y-axis is surface gravity (g), therefore "2000" in the y-axis represents two thousand times the surface gravity (g). The x-axis represents various timings during the impact test. As shown in FIG. 4, the duration of the impact test is approximately 10 ms. The first detected acceleration is recorded at 3 ms. The dot line represents background data without applying the polymer composite material of Embodiment 1 during the duration of the impact test; and the solid line represents testing data with the polymer composite material of Embodiment 1 the duration of the impact test. As illustrated in FIG. 4, the maximum value of the dot line (background data without applying the polymer composite material of Embodiment 1) is approximately 10880.15 g, and the maximum value of the solid line (data with the polymer composite material of Embodiment 1) is merely about 855.26 g. Therefore, damping performance (stress buffering) of Embodiment 1 is approximately 92%. Accordingly, the polymer composite material of Embodiment 1 of the present disclosure has good stress buffering properties.

Embodiment 2

First, polytetramethylene glycol (PTMG) and maleic anhydride (MA) are mixed. The molecular weight of PTMG is substantially 2000 (g/mol). About 371.20 g of PTMG and about 26 g of MA are weighted and mixed to perform an esterification reaction under suitable reaction conditions to form the oligomer (I). Both ends of the oligomer (I) are carboxylic acid groups. Next, about 6.9 g of 2-hydroxyethyl methacrylate (HEMA) is weighted and mixed with one end of the oligomer (I) to form oligomer (II) in condensation reaction. HEMA is reacted with one end of the oligomer (I). Next, about 10.73 g of triethylamine is mixed with the oligomer (II). The triethylamine is reacted with the other end of the oligomer (II) to form the oligomer precursor of Embodiment 2 of the present disclosure, PT20-MA-HT.

On the other hand, a solution of shear thickening fluid (STF) is prepared. The STF solution includes silica ($SiO_2$) particles. The STF solution is prepared by adding $SiO_2$ particles (the average particle size is 15 nm) into glycerol (propane-1,2,3-triol). The weight percentage of the $SiO_2$ particles is 35% in the STF solution.

Finally, about 20 g of the oligomer precursor of Embodiment 2 of the present disclosure, PT20-MA-HT, is mixed with 8.6 g of the STF solution and 0.5 g of initiator (Chivacure® TPO). UV light (with a wavelength about 365 nm, power about 500 W) is applied to the mixture of the oligomer precursor, the STF solution, and the initiator. Therefore, carbon-carbon double bonds (C=C) in the oligomer precursor of Embodiment 2, PT20-MA-HT, are cross-linked under the effect of the initiator (Chivacure® TPO) to form a phase changed cross-linking polymer, and the STF dispersed between the oligomer precursors, PT20-MA-HT, are encapsulated and dispersed within the phase changed cross-linking polymer.

Figure 5:
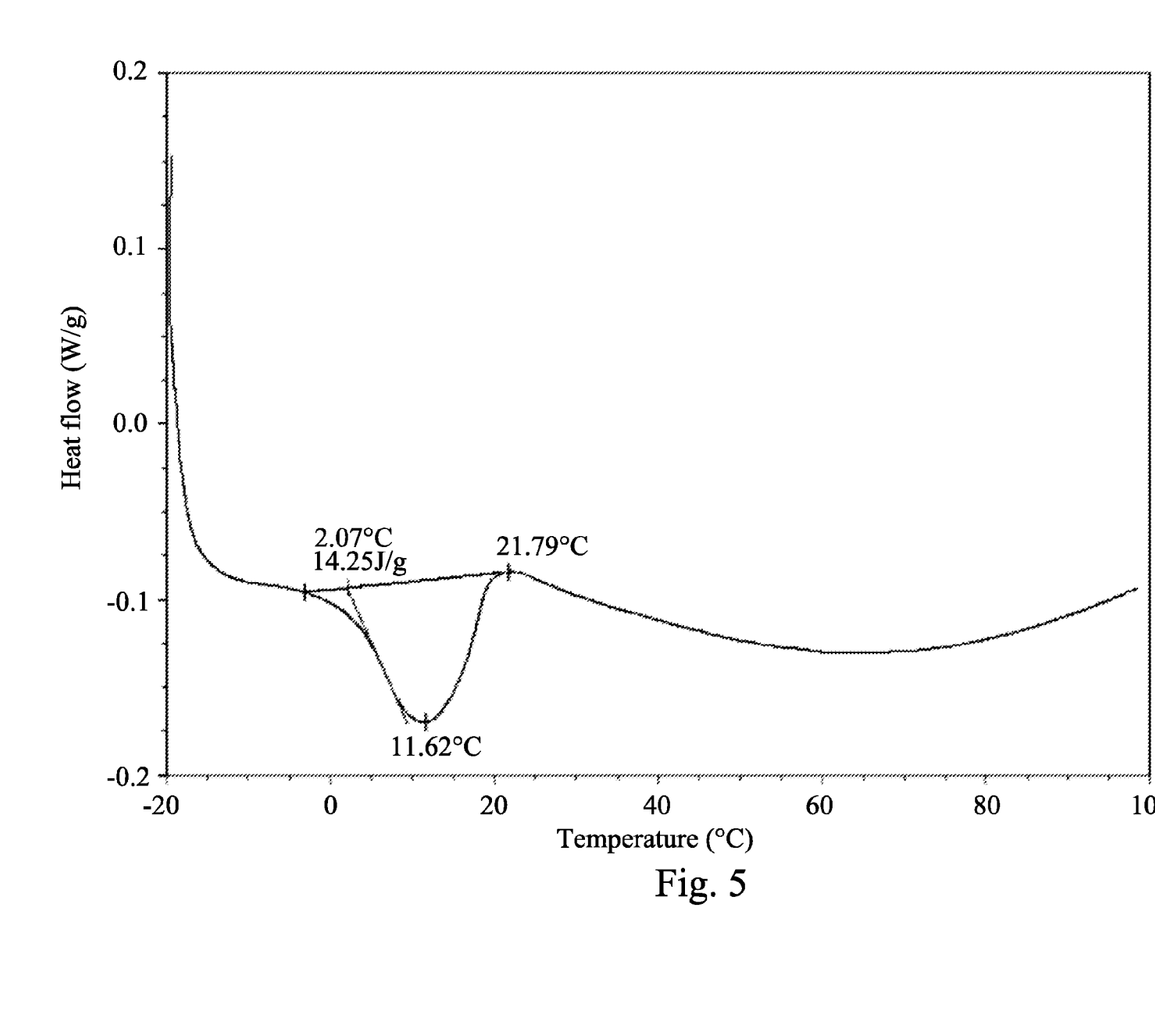
FIG. 5 is the experiment data in differential scanning calorimeter (DSC) of Embodiment 2 of the present disclosure.

Referring to FIG. 5, FIG. 5 is the experiment data in differential scanning calorimeter (DSC) of Embodiment 2 of the present disclosure. The details of DSC are similar to those described in aforementioned Embodiment 1, and therefore are omitted here. Heat flows of the sample (as shown in y-axis of FIG. 5), Embodiment 2 of the present disclosure, are continually detected and recorded while a process of increasing the temperatures of the sample (as shown in x-axis of FIG. 5). In FIG. 5, heat flows from the sample (exothermic) are defined as positive values (upward); and heat flows in the sample (endothermic) are defined as negative values (downward). The x-axis represents various temperatures of the sample during the procedure of DSC measuring. As shown in FIG. 5, the sample, Embodiment 2, could phase change and be endothermic at 11.62° C. because of rotating or rearranging of the polyester segments in the phase changed cross-linking polymer. The phase transition temperature of Embodiment 2 substantially ranges from about 2.07° C. to about 21.79° C. In other words, Embodiment 2 has special endothermic properties in the range of its phase transition temperature, and the main endothermic temperature is 11.62° C. Accordingly, the phase changed cross-linking polymer of Embodiment 2 of the present disclosure possesses temperature buffering properties.

Figure 6:
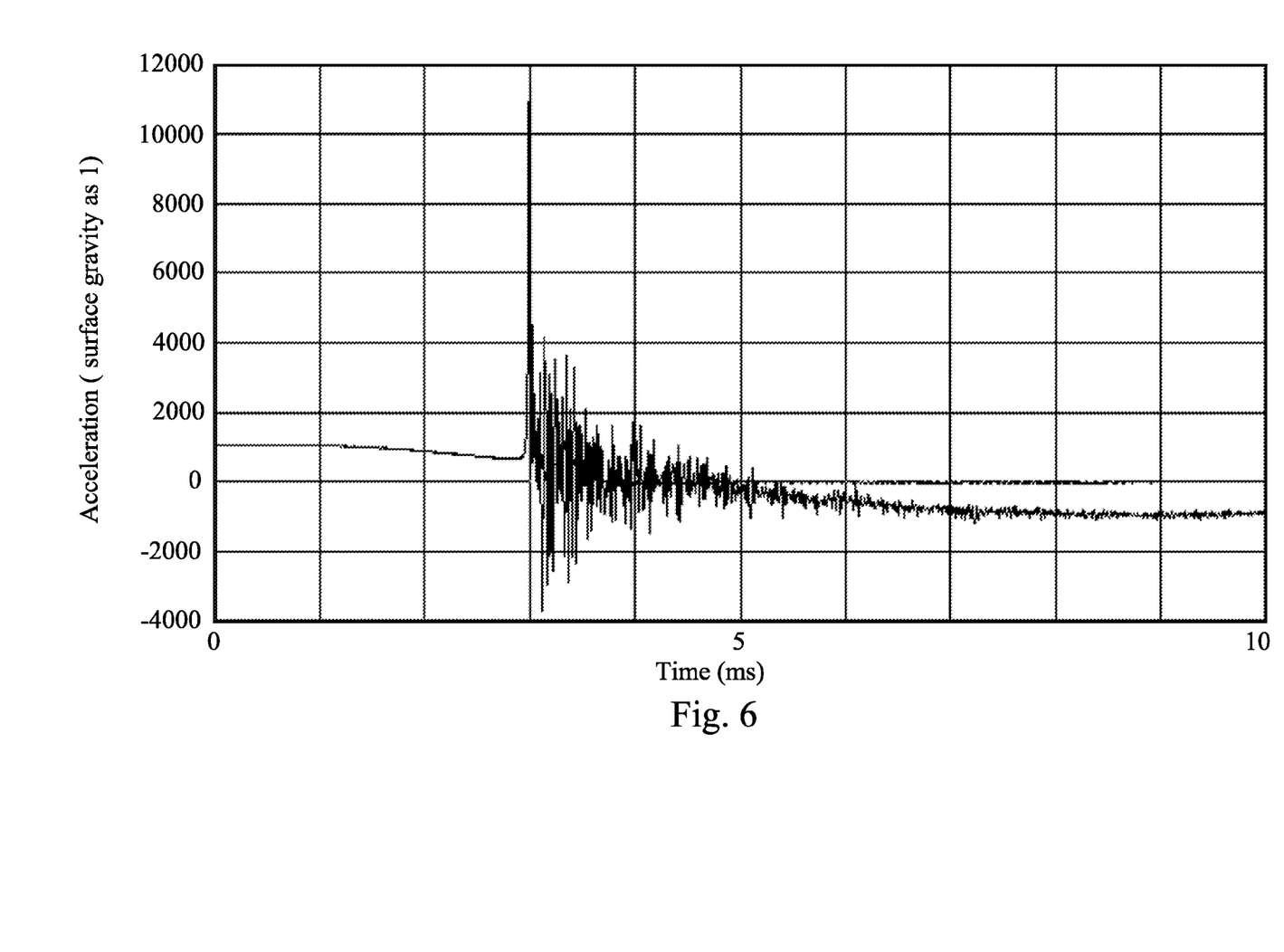
FIG. 6 is the experiment data in impact test of Embodiment 2 of the present disclosure.

Referring to FIG. 6, FIG. 6 is the experiment data in impact test of Embodiment 2 of the present disclosure. The details of the impact test of Embodiment 2 are similar to those described in aforementioned Embodiment 1, and therefore omitted here. As shown in FIG. 6, the duration of the impact test is approximately 10 ms. The first detected acceleration is recorded at about 3 ms. The dot line represents background data without applying the polymer composite material of Embodiment 2 during the duration of the impact test; and the solid line represents testing data with the polymer composite material of Embodiment 2 the duration of the impact test. As illustrated in FIG. 6, the maximum value of the dot line (background data without applying the polymer composite material of Embodiment 2) is approximately 11352.87 g, and the maximum value of the solid line (data with the polymer composite material of Embodiment 2) is merely about 1988.22 g. Therefore, damping performance (stress buffering) of Embodiment 2 is approximately 82%. Accordingly, the polymer composite material of Embodiment 2 of the present disclosure also has good stress buffering properties.

Embodiment 3

First, polytetramethylene glycol (PTMG) and maleic anhydride (MA) are mixed. The molecular weight of PTMG is substantially 3000 (g/mol). About 636.35 g of PTMG and about 26 g of MA are weighted and mixed to perform an esterification reaction under suitable reaction conditions to form the oligomer (I). Both ends of the oligomer (I) are carboxylic acid groups. Next, about 10.73 g of triethylamine is mixed with the oligomer (II). The triethylamine is reacted with the other end of the oligomer (II) to form the oligomer precursor of Embodiment 3 of the present disclosure, PT30-MA-HT.

On the other hand, a solution of shear thickening fluid (STF) is prepared. The STF solution includes silica ($SiO_2$) particles. The STF solution is prepared by adding $SiO_2$ particles (the average particle size is 15 nm) into glycerol (propane-1,2,3-triol). The weight percentage of the $SiO_2$ particles is 35% in the STF solution.

Finally, about 20 g of the oligomer precursor of Embodiment 2 of the present disclosure, PT20-MA-HT, is mixed with 8.6 g of the STF solution and 0.5 g of initiator (Chivacure® TPO). UV light (with a wavelength about 365 nm, power about 500 W) is applied to the mixture of the oligomer precursor, the STF solution, and the initiator. Therefore, carbon-carbon double bonds (C=C) in the oligomer precursor of Embodiment 3, PT30-MA-HT, are cross-linked under the effect of the initiator (Chivacure® TPO) to form a phase changed cross-linking polymer, and the STF dispersed between the oligomer precursors, PT30-MA-HT, are encapsulated and dispersed within the phase changed cross-linking polymer.

Figure 7:
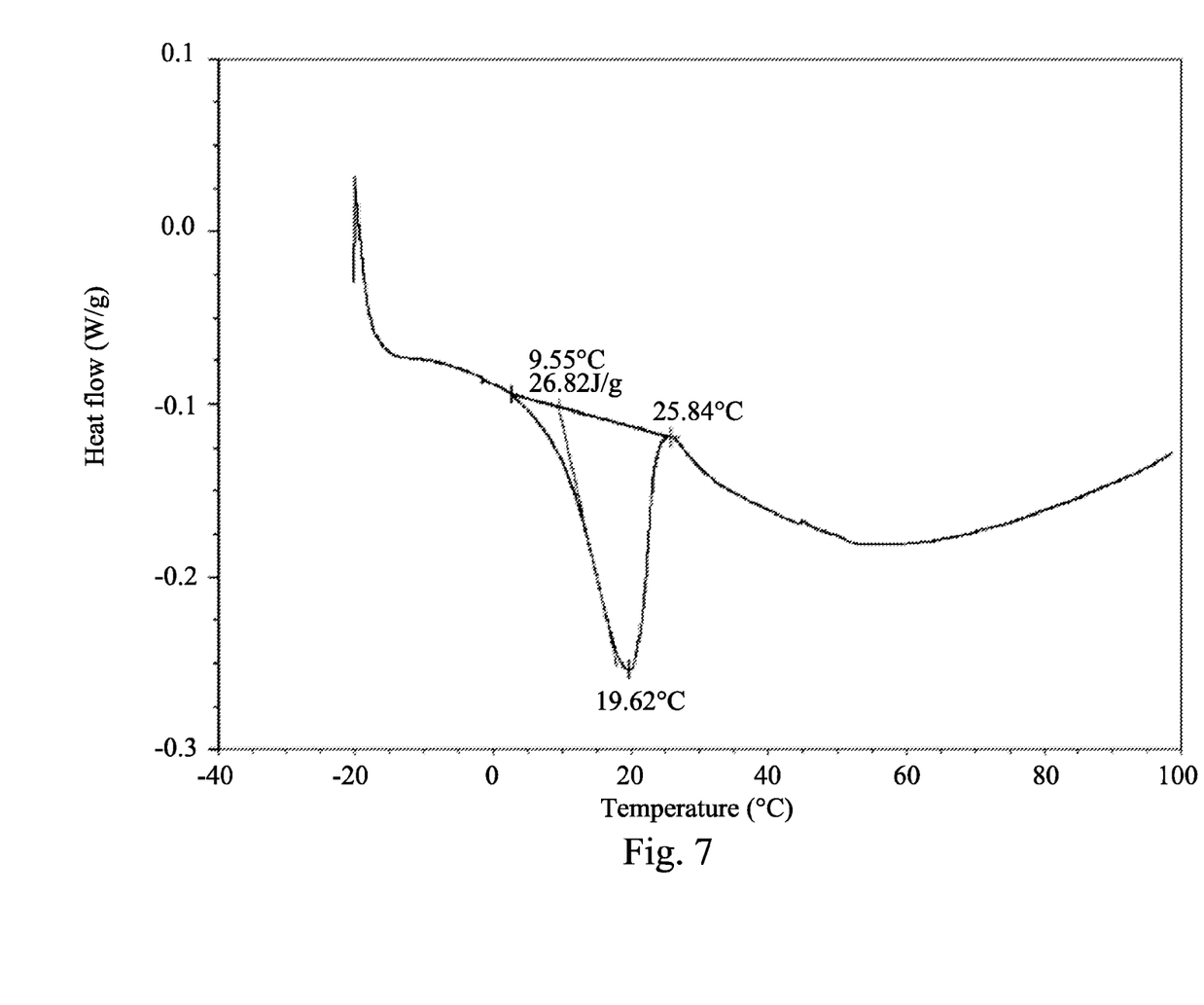
FIG. 7 is the experiment data in differential scanning calorimeter (DSC) of Embodiment 3 of the present disclosure.

Referring to FIG. 7, FIG. 7 is the experiment data in differential scanning calorimeter (DSC) of Embodiment 3 of the present disclosure. The details of DSC are similar to those described in aforementioned Embodiment 1, and therefore are omitted here. Heat flows of the sample (as shown in y-axis of FIG. 7), Embodiment 3 of the present disclosure, are continually detected and recorded while a process of increasing the temperatures of the sample (as shown in x-axis of FIG. 7). In FIG. 7, heat flows from the sample (exothermic) are defined as positive values (upward); and heat flows in the sample (endothermic) are defined as negative values (downward). The x-axis represents various temperatures of the sample during the procedure of DSC measuring. As shown in FIG. 7, the sample, Embodiment 3, could phase change and be endothermic at 19.62° C. because of rotating or rearranging of the polyester segments in the phase changed cross-linking polymer. The phase transition temperature of Embodiment 3 substantially ranges from about 9.55° C. to about 25.84° C. In other words, Embodiment 3 has special endothermic properties in the range of its phase transition temperature, and the main endothermic temperature is 19.62° C. Accordingly, the phase changed cross-linking polymer of Embodiment 3 of the present disclosure possesses temperature buffering properties.

Figure 8:
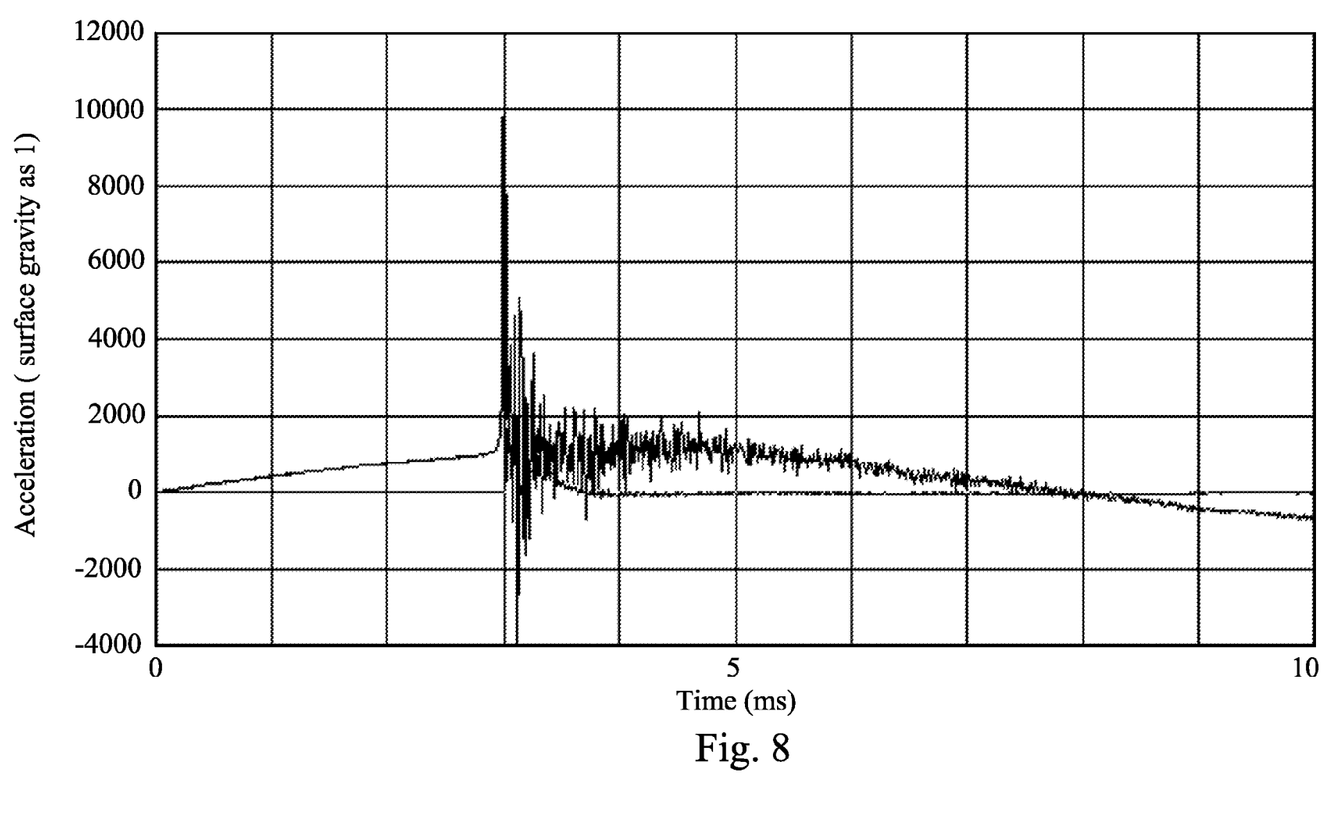
FIG. 8 is the experiment data in impact test of Embodiment 3 of the present disclosure.

Referring to FIG. 8, FIG. 8 is the experiment data in impact test of Embodiment 3 of the present disclosure. The details of the impact test of Embodiment 3 are similar to those described in aforementioned Embodiment 1, and therefore omitted here. As shown in FIG. 8, the duration of the impact test is approximately 10 ms. The first detected acceleration is recorded at about 3 ms. The dot line represents background data without applying the polymer composite material of Embodiment 3 during the duration of the impact test; and the solid line represents testing data with the polymer composite material of Embodiment 3 the duration of the impact test. As illustrated in FIG. 8, the maximum value of the dot line (background data without applying the polymer composite material of Embodiment 3) is approximately 12225.28 g, and the maximum value of the solid line (data with the polymer composite material of Embodiment 3) is merely about 1951.60 g. Therefore, damping performance (stress buffering) of Embodiment 3 is approximately 84%. Accordingly, the polymer composite material of Embodiment 3 of the present disclosure also has good stress buffering properties.

It should be noticed that the polymer composite materials in various embodiments of the present disclosure have special functional groups such as carbon-carbon double bonds (C=C), ionic groups and polyester segments. Since those functional groups respectively have various properties, those properties are integrated in the polymer composite materials in various embodiments of the present disclosure. The ionic groups are capable to form hydrogen bondings with stress buffering molecules (such as polyols), and disperse those molecules between the oligomer precursors well. The carbon-carbon double bonds (C=C) perform energy saving, environment friendly, and fast adding polymerization process, and the stress buffering molecules (such as polyols) could be encapsulated and dispersed within the phase changed cross-linking polymer formed the oligomer precursors. The polyester segments in the phase changed cross-linking polymer could phase change by rotating and/or rearrange to be endothermic or exothermic, therefore the phase changed cross-linking polymer of the polymer composite materials in various embodiments of the present disclosure is also a temperature buffering material. Accordingly, the polymer composite material in various embodiments of the present disclosure is not multi-functional buffering (stress and temperature), but also energy saving and environment friendly.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A polymer composite material, comprising:
    a polyol; and
    a phase changed cross-linking polymer,
    wherein the phase changed cross-linking polymer, polymerized of an oligomer precursor having at least two carbon-carbon double bonds (C=C), at least one ionic group, and at least one polyester segment, has at least one ionic group, the at least one ionic group and a hydroxyl group of the polyol are combined by a hydrogen bond, the polyol is dispersed within the phase changed cross-linking polymer, a weight percentage of the polyol is 20-60%, and a weight percentage of the phase changed cross-linking polymer is 40-80%.

2. The polymer composite material of claim 1, wherein the polyol further comprises a plurality of inorganic oxide particles dispersed in the polyol.

3. The polymer composite material of claim 2, wherein the inorganic oxide particles are nanoscale silica particles.

4. The polymer composite material of claim 3, wherein a particle size of the nanoscale silica particles is less than 50nm.

5. The polymer composite material of claim 2, wherein the polyol is polyethylene glycol (PEG), polytetrahydrofuran (PTMG), glycerol or a combination thereof.

6. The polymer composite material of claim 1, wherein the oligomer precursor is a co-polymer composed of the polyol, an ene-dianhydride, and a triethanolamine or a triethylamine.

7. The polymer composite material of claim 1, wherein the oligomer precursor further comprises a hydroxyethyl methacrylate (HEMA).

8. The polymer composite material of claim 1, wherein a phase transition temperature of the phase changed cross-linking polymer is 2° C.-27° C.

9. The polymer composite material of claim 1, further comprising a polyurethane (PU), an ethylene-vinyl acetate copolymer, a silicone resin or combinations thereof.

* * * * *